United States Patent [19]
Henton

[11] Patent Number: 4,785,051
[45] Date of Patent: Nov. 15, 1988

[54] RUBBER-MODIFIED MONOVINYLIDENE AROMATIC POLYMER COMPOSITIONS

[75] Inventor: David E. Henton, Midland, Mich.

[73] Assignee: The Dow Chemical Company, Midland, Mich.

[21] Appl. No.: 24,872

[22] Filed: Mar. 17, 1987

Related U.S. Application Data

[63] Continuation of Ser. No. 840,484, Mar. 14, 1986, abandoned, which is a continuation of Ser. No. 726,577, Apr. 24, 1985, abandoned, which is a continuation of Ser. No. 353,910, Nov. 21, 1983, abandoned.

[51] Int. Cl.$^4$ ............................................... C08L 51/04
[52] U.S. Cl. .......................................... 525/71; 525/86
[58] Field of Search ........................................... 525/71

[56] References Cited

U.S. PATENT DOCUMENTS

| | | | |
|---|---|---|---|
| 3,639,522 | 2/1972 | Narayana et al. | 525/316 |
| 3,652,721 | 3/1972 | Dalton et al. | 525/71 |
| 3,665,057 | 5/1972 | Tanaka et al. | 525/71 |
| 3,825,625 | 7/1974 | Kudo et al. | 525/316 |
| 4,009,226 | 2/1977 | Ott et al. | 525/71 |
| 4,233,409 | 11/1980 | Bulkley | 525/71 |
| 4,430,478 | 2/1984 | Schmitt et al. | 525/71 |
| 4,524,180 | 6/1985 | Sun | 525/71 |

FOREIGN PATENT DOCUMENTS 0052732 6/1982 European Pat. Off. .............. 525/71

Primary Examiner—Wilbert J. Briggs, Sr.

[57] ABSTRACT

According to the present invention, there are produced rubber-modified monovinylidene aromatic polymers having three different types of rubber particles. The first is a small particle. The second is a large emulsion particle. The third is a large mass particle. Compositions according to the present invention exhibit good combinations of toughness and gloss.

23 Claims, No Drawings

RUBBER-MODIFIED MONOVINYLIDENE AROMATIC POLYMER COMPOSITIONS

CROSS REFERENCE TO RELATED APPLICATION

This is a continuation of application Ser. No. 840,484, filed Mar. 14, 1986, now abandoned, which is a continuation of application Ser. No. 726,577, filed Apr. 24, 1985, now abandoned, which is a continuation of application Ser. No. 553,910 filed Nov. 21, 1983, now abandoned.

BACKGROUND OF THE INVENTION

This invention relates to high impact monovinylidene aromatic polymer compositions. High impact polystyrene (HIPS) compositions comprising polystyrene having a particulate elastomeric material dispersed therein are well known in the art as are uses for such materials. It is also known that the physical properties of these types of compositions are affected by the relative amounts of elastomer particles having different sizes and different particle structures. With regard to the size of the particles, it is known that the larger rubber particles having diameters greater than about 0.5 microns ($\mu$) contribute greatly to impact resistance but tend to reduce the gloss of articles formed or molded from compositions containing those particles. This is especially true in the case of the mass-type of particles which will be described below. On the other hand, when smaller modifying rubber particles are used in polymer compositions, articles formed therefrom ten to be glossier but are less impact resistant than if the same amount of rubber was used in the form of larger particles.

Concerning the structures of the individual rubber particles (i.e., rubber particle morphology), there are two general types of rubber particles which can be used in rubber-modified polymer compositions. One type of particle is the occlusion containing mass particles, the other is the generally solid emulsion particles. In both cases, the rubber particles are usually grafted with amounts of a polymer compositionally similar, preferably identical, to the matrix polymer in which the particles are to be dispersed. It is generally believed that the grafted rubber particles containing occlusions of matrix polymer therein provide more impact resistance than the same amount of rubber in the form of similarly grafted emulsion particles. The grafted occlusion-containing rubber particles are formed and grafted in the well-known mass, mass-solution or mass suspension types of polymerization process where a previously produced rubber is dissolved in an amount of polymerizable monomer or in a mixture or solution of polymerizable monomer(s) with optional diluents, which monomer(s) are thereafter polymerized. The polymerization of the monomers with agitation causes the formation of occlusion-containing particles of rubber by the well known process of phase inversion. In a mass-suspension process, the reaction mass is then suspended in water and polymerization completed. Particles produced in such mass, mass-solution or mass-suspension processes, or variations of these processes, containing occlusions of the grafted polymer are hereinafter reference to a "mass particles".

The other main type of rubber particle morphology, the emulsion rubber particle, is achieved by emulsion polymerization of the rubber in an aqueous latex, forming a group of rubber particles. After the rubber particles are made, polymerizable and graftable monomers (e.g., styrene) are usually added to the rubber containing latex and polymerized to form the graft portion of these particles and, optionally, amounts of matrix polymer. This type of rubber particle, produced via an emulsion polymerization process is hereinafter referred to as an "emulsion particle". Due to their small size, emulsion particles are generally able to provide a limited degree of impact improvement while maintaining the gloss of articles molded from compositions which contain them. It is also known that small rubber particles can be agglomerated to form larger, agglomerate particles, which larger agglomerate particles can be used to improve the impact resistance of polymeric compositions while reducing gloss slightly.

In view of these phenomena, a great deal of effort has gone into achieving optimized property distributions by tailoring the rubber particle distributions (i.e., the relative amounts of the rubber particles of particular sizes and structures), see for example, Canadian Patent No. 832,523; and U.S. Pat. Nos. 3,592,878, 3,825,621, 4,012,462, 4,146,589, 4,153,645, 4,214,056, 4,221,883, 4,334,039, and also European Patent Appln. No. 48,389 which are incorporated herein by reference. In these references, high impact polystyrene compositions having "bimodal" particle size distributions are taught. As used in the art and herein, a composition having a bimodal particle size distribution contains two distinct groups of rubber particles, each group having a different average particle size and/or having a different particle structure.

In many of the utilizations of polymeric compositions, they are exposed to both organic solvents and stress, such as when the compositions are molded into containers for oil- or fat-containing materials. The failure of materials when exposed to both solvent action and stress has become known as environmental stress cracking. As is known, the HIPS compositions of the prior art generally have poor environmental stress crack resistance in these types of situations and therefore either perform poorly when used in such situations or are not used at all.

SUMMARY OF THE INVENTION

The present invention is an improved rubber-modified monovinylidene aromatic polymer composition comprising:

(a) a matrix of a monovinylidene aromatic polymer, and (b) an elastomeric material (rubber), in an amount sufficient to toughen said composition, such elastomeric material being in the form of discrete particles dispersed throughout the matrix of the monovinylidene aromatic polymer and grafted with monovinylidene aromatic polymer;

wherein the improvement comprises the dispersed rubber particles comprising the following three components:

(1) a small particle component being from about 5 to about 85 weight percent of the rubber, the particles of this component having a volume average diameter of about 0.04 to about 0.30 microns ($\mu$);

(2) a large emulsion particle component being from about 5 to about 85 weight percent of the rubber, the particles of this component having a volume average diameter of from about 0.4 to about 3.0$\mu$; and (3) a large mass particle component being from about 2 to about 90 weight percent of the rubber, the particles of this component having a volume average diameter of from about 0.6 to about 10μ.

These compositions exhibit good combinations of toughness, gloss and environmental stress crack resistance.

DETAILED DESCRIPTION OF THE INVENTION

The compositions according to the present invention comprise several elements:

(a) the monovinylidene aromatic polymer in the matrix or continuous phase;

(b) the particulate elastomeric material (rubber) dispersed in the matrix, the elastomeric material in turn comprising three components;

(c) an amount of so-called superstrate polymer polymerized or grafted onto the rubber particles or substrate; and (d) an amount of polymer occluded within the mass particles in addition to the amounts grafted thereto.

The matrix or continuous phase polymer of the present invention as well as the grafted and occluded polymer consists at least principally of a polymer of a monovinylidene aromatic monomer of the formula:

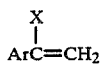

wherein Ar represents an aromatic hydrocarbon radical or an aromatic halohydrocarbon radical and X is selected from the group consisting of hydrogen and alkyl radicals of less than three carbon atoms. Exemplary of the monomers that can be employed in the polymer are styrene; a-alkylmonovinylidene aromatic compounds, e.g., α-methylstyrene; ring-substituted alkylstyrenes, e.g., para-vinyltoluene; ring-substituted halostyrenes, e.g., ortho-chlorostyrene; etc. If so desired, mixtures of such monovinylidene aromatic monomers ma be employed.

It has been found that the weight average molecular weight (Mw) of all the matrix (ungrafted and unoccluded) monovinylidene aromatic polymer from all sources should be from about 50,000 to about 350,000, preferably from about 80,000 to about 300,000.

In addition to the monovinylidene aromatic monomers, small amounts of various additional monomers may be included in polymerized form in the rubber-modified polymer compositions according to the present invention. Preferably, however, the matrix grafted and occluded polymer consists essentially of polymerized monovinylidene aromatic monomer(s). Copolymers of monovinylidene aromatic monomer(s) with sbbstantial amounts of ethylenically unsaturated nitrile monomers, i.e., more than 10 weight percent, are not encompassed within the scope of the present invention. In one embodiment of the present invention, it has been found that methyl methacrylate can advantageously be included in compositions according to the present invention, in polymerized form, in amounts up to about 60 weight percent based on total weight of the polymerized monovinylidene aromatic and methyl methacrylate monomers. As is well known, methyl methacrylate is typically used in such polymers to match the refractive index of the matrix polymer with the refractive index of the particulate elastomer in order to provide transparent high-impact polymer compositions.

It may also be desirable to blend in with the present compositions amounts of other polymers and/or copolymers, such as a polycarbonates, polyester polycarbonates, and polymers and/or copolymers of phenylene oxide.

The elastomeric materials suitable for use in the present invention include practically any of the various known elastomeric materials. As used herein the terms "elastomeric materials" or "rubbers" include the synthetic and natural polymeric materials having glass transition temperatures below about 0° C., preferably below about −20° C., as determined by American Society for Testing and Material (ASTM) Test Method D 3418-82, which materials serve to improve the impact resistance of more brittle polymeric materials according to the present invention. These materials include diene rubbers, ethylene-propylene rubbers, ethylene-propylene-diene (EPDM) rubbers, acrylate rubbers, halogen-containing rubbers, and mixtures thereof, including interpolymers of rubber-forming monomers with other copolymerizable monomers.

The preferred rubbers are diene rubbers or mixtures of diene rubbers, i.e., any rubbery polymer of one or more conjugated 1,3-dienes, e.g., butadiene, isoprene, piperylene, chloroprene, etc. Such rubbers include homopolymers of conjugated 1,3-dienes and interpolymers of conjugated 1,3-dienes with up to an equal amount by weight of one or more copolymerizable monoethylenically unsaturated monomers, such as monovinylidene aromatic monomers, in either random or block copolymer form.

In order to provide the resultant compositions with improved resistance to weathering, the EPDM or ethylene-propylene type rubbers are desirable.

Although the rubber may contain up to about 2 percent crosslinking agent based on the weight of the rubber-forming monomer or monomers, crosslinking may present problems in dissolving the rubber in monomers for the graft polymerization reaction where mass or mass suspension polymerization processes are used to form the grafted polymer. In addition, excessive crosslinking can result in the loss of rubbery characteristics. The crosslinking agent can be any of the agents conventionally employed for crosslinking diene rubbers, e.g., divinylbenzene, diallyl maleate, diallyl fumarate, diallyl adipate, allyl acrylate, allyl methacrylate, diacrylates, and diacrylates of polyhydric alcohols, e.g., ethylene glycol dimethacrylate, etc.

A preferred group of rubbers are those consisting essentially of about 70 to 100 percent by weight of butadiene and/or isoprene and up to about 30 percent by weight of monovinylidene aromatic monomer. Particularly advantageous substrates are butadiene homopolymer or an interpolymer of about 70 to 97 percent by weight butadiene and about 3 to 30 percent by weight styrene.

Various techniques customarily employed for polymerizing rubber monomers include Ziegler-Natta, anionic and free radical polymerization. Free radical emulsion polymerization can be used to produce a latex containing emulsion rubber particles which are useful as the base for emulsion polymerization of the grafted polymer to form the grafted emulsion particles.

The compositions according to the present invention generally contain a toughening amount of the rubber material. Preferably, the compositions according to the present invention comprise from about 2 to about 25 percent by weight rubber, more preferably from about 3 to about 22 percent by weight rubber, and most preferably from about 5 to about 18 percent by weight rubber, said percentages by weight being based on the total rubber-modified composition weight.

The essence of the present invention is that the particulate elastomeric material dispersed in the monovinylidene aromatic polymer comprises three different components. It has been found especially desirable for the dispersed particulate rubber to consist essentially of the three particle components. By the term "rubber particle component" is meant a group of rubber particles of the same rubber particle type and having approximately the same particle size. The average particle size of the rubber particle component as used herein refers to the volume average diameter of the group of particles making the rubber component or particle type. In the case of the emulsion produced particles, the average particle diameter measurement referred to herein is made before any of the monovinylidene aromatic polymer is grafted onto the rubber particles, while in the case of the mass particles the size includes the polymer grafted to the rubber particles and occlusions of polymer within the particles. The average diameter of particles can be determined by the examination of transmission electron micrographs of compositions containing the particles. The volume average diameters of emulsion particle groups having average particle diameters of less than about 1 micron can also be conveniently determined as can the number average diameters and the particle size distributions by hydrodynamic chromatography (HDC). Hydrodynamic chromatography is explained in U.S. Pat. No. 3,865,717 and is also discussed in an article by M. A. Langhorst in the *Journal of Colloid and Interface Science*, in Vol. 89, No. 1 in September, 1982.

It is recognized, of course, that the various rubber particle components comprise particles having a range of sizes, such components not consisting of particles of only one size. The above analysis techniques indicate, however, that the particles of a particular rubber component should generally have a fairly narrow range of particle sizes. By this it is meant that the ratio of the weight average particle diameter of a particle group to the number average particle diameter of the same particle group is generally in the range of about 1 to about 6.5, preferably from about 1 to about 3.5.

The first of the rubber components required in the present invention has a relatively small average particle size and is hereinafter referred to as the small particle component. This group of particles has a weight average particle diameter of from about 0.04 to about 0.30 microns. These small particles are most preferably prepared by emulsion polymerizing a mixture of rubber-forming monomers to form a dispersion of uniformly sized particles of the desired size as is well known in the art. It has been found that this component advantageously has an average particle size of from about 0.09 to about 0.2 microns.

This small particle component typically makes up from about 5 to about 85 weight percent of the rubber in the present invention. However, it has been found preferable if the small particle component is from about 8 to about 45 weight percent of the rubber, while the range of from about 10 to about 40 weight percent is especially preferable. Within these ranges, the small particle rubber adds to the impact resistance of the resultant polymeric composition with very little sacrifice in the gloss of the articles that are molded from such composition. Holding the rubber content constant while increasing the relative proportion of small rubber particles in compositions according to the present invention will produce resins which are capable of being molded into articles which will exhibit good gloss.

Preferably, these small particles are grafted with monovinylidene aromatic polymer. It is usually desirable in grafting polymer onto the particles of this component to achieve a graft to rubber ratio (g/r) of at least about 0.1, preferably from about 0.2 to about 2, in order to achieve desired gloss and impact resistance in the resultant rubber-modified monovinylidene aromatic polymer composition. As is known, the graft to rubber ratio is ratio of (g) the weight of polymer grafted to the rubber, to (r), the weight of the rubber to which the polymer is grafted. Methods to determine g/r values for compositions such as those according to the present invention are generally known in the art. For example, ungrafted polymer can be separated from the rubber and grafted polymer using multiple toluene extractions. Then, knowing the percentage of rubber in the starting sample and the weight of the starting sample, the g/r value can be determined by weighing the resultant gel which is rubber plus graft polymer. The graft (g) is the amount of the sample in excess of the rubber.

The second rubber component essentially included in the rubber-modified compositions according to the present invention is referred to as the large emulsion particle component. This component has an average particle size of from about 0.4 to about 3.0 microns, preferably from about 0.6 to about 2.5 microns. Preferably, the large emulsion particles are agglomerates of smaller emulsion particles, most preferably, the small emulsion particles that make up the small particle component of the compositions according to the present invention.

The large emulsion particle component typically makes up from about 5 to about 85 weight percent of the dispersed rubber, preferably from about 10 to about 80 weight percent and most preferably from about 15 to about 50 weight percent. As is known and described above, emulsion polymerization of rubber forming monomers in an aqueous latex generally produces small, nearly solid particles of rubber. It has been found that under most circumstances emulsion polymerization techniques are generally economically feasible for production of rubber particles having diameters of less than about 0.25 microns or so. Therefore, when particles of that size are produced, such particles must usually be agglomerated or coagulated in some way to achieve the large emulsion particles. Such agglomerating and coagulating techniques are well known in the art. A particularly desirable technique for the controlled agglomeration of the particles of an emulsion prepared rubber latex to produce the emulsion particles suitable for use in the present invention is taught in pending U.S. patent application, Ser. No. 350,849, filed Feb. 22, 1982, now U.S. Pat. No. 4,419,496, entitled "Particle Agglomeration in Rubber Latices" by D. E. Henton and T. M. O'Brien, which application is incorporated herein by reference. Within the range of the present invention, the use of larger particles in this component or the use of larger percentages of this component while holding the other compositional characteristics constant will usually result in better impact resistance in the resultant polymer composition.

Preferably, these large emulsion particles are grafted with monovinylidene aromatic polymer. It is usually desirable to graft enough polymer onto the particles of this component to achieve a graft to rubber ratio of at least about 0.10 in order to balance gloss and impact properties in the resultant composition.

It has been found beneficial to have a g/r for the total rubber in components (1) and (2) of at least about 0.1, preferably from about 0.15 to about 1.

The third rubber component essential to the present invention is the large mass particle component. This component has an average particle size of from about 0.6 to about 10.0 microns, preferably from about 0.7 to about 5 microns, and where a high gloss product is desired from about 0.8 to about 1.5 microns. This mass particle component typically makes up from about 2 to about 90 weight percent of the rubber, preferably from about 15 to about 85 weight percent and most preferably from about 15 to about 50 weight percent. It is necessary that the particles used for this component have occluded therein and grafted thereto amounts of monovinylidene aromatic polymer. As is well known and described above, these types of particles are very conveniently produced by mass, mass solution or mass suspension type polymerization processes. Such processes are well known in the art.

It is usually desirable to have grafted to and occluded within these particles sufficient monovinylidene aromatic polymer such that the ratio of the weight of such grafted and occluded polymer superstrate to the weight of the rubber substrate is at least about 0.5, preferably such ratio is at least about 1 and more preferably between about 1 and 5.

In spite of the fact that the large mass particles present in rubber-modified monovinylidene aromatic polymers have a detrimental effect on the gloss of articles molded from such compositions, they are a very desirable constituent of rubber-modified polymer compositions according to the present invention. One basis for their desirability is that, probably due to their occluded nature, they provide good impact resistance relative to the amount of rubber which is actually used to make such particles. Other desirable facets of including mass particles in rubber-modified monovinylidene aromatic polymer compositions include the ability to utilize a wide variety of rubber compositions and types and also the economy and efficiency of the mass type processes by which they are formed.

According to the present invention and within the above-described ranges, compositions according the present invention exhibit good combinations of gloss and impact resistance relative to the sizes of the particles and the amount of rubber which they contain. By variations in the relative amounts and/or the average particle sizes of the three rubber components, monovinylidene aromatic polymer compositions can be produced having better combinations of gloss and impact resistance than prior art compositions having similar amounts of rubber. The present invention is, therefore, easily adaptable to provide compositions having certain desired properties optimized without much, if any, sacrifice of the others.

For example, rubber-modified monovinylidene aromatic polymer compositions having high gloss and very good toughness can be prepared according to the present invention when the modifying rubber therein comprises:

(a) from about 5 to about 25, preferably from about 5 to about 15, weight percent small emulsion particles, the group of emulsion particles having a volume average diameter of from about 0.05 to about 0.30 microns, preferably from about 0.09 to about 0.2 microns, (b) from about 5 to about 85, preferably from about 10 to about 50, weight percent large emulsion particles, preferably resulting from the agglomeration of smaller particles, the group of large emulsion particles having a volume average diameter of from about 0.5 to about 3 microns, preferably from about 0.6 to about 2.5 microns, and (c) from about 10 to about 90, preferably from about 50 to about 80, weight percent large mass particles, the group of large mass particles having a volume average diameter of from about 1 to about 10 microns, preferably from about 1.5 to about 5 microns.

On the other hand, where it is desired to combine good toughness with very high gloss, the composition would comprise as the modifying rubber:

(a) from about 15 to about 85, preferably from about 25 to about 70, weight percent small emulsion particles, the group of small emulsion particles having a volume average diameter of from about 0.05 to about 0.3 microns, preferably from about 0.09 to about 0.2 microns, (b) from about 5 to about 85, preferably from about 15 to about 80, weight percent large emulsion particles, which large emulsion particles preferably result from the agglomeration of smaller emulsion particles, the group of large emulsion particles having a volume average diameter of from about 0.4 to about 3 microns, preferably from about 0.6 to about 2.5 microns, and (c) from about 2 to about 90, preferably from about 10 to about 50, weight percent large mass particles, the group of large mass particles having a volume average diameter of from about 0.6 to about 3. microns, preferably from about 0.8 to about 1.5 microns.

In the rubber-modified monovinylidene aromatic polymer compositions according to the present invention, it is preferred that the rubber therein consist essentially of the three components.

It has also been found that in addition to the good combinations of gloss and toughness, compositions prepared according to the present invention also possess good resistance to environmental stress cracking. As is known, environmental stress cracking can result when monovinylidene aromatic resins and other resins are placed under stress and exposed to certain chemicals. The presence of these chemicals, which include various types of naturally occurring solvents and fatty acids, greatly accellerates the failure of the parts molded from the resins. Environmental stress crack resistance (ESCR) is especially important for resin parts which are exposed to various food materials containing fats and greases. Fats and greases have been found to be especially active in causing environmental stress cracking (ESC).

An additional property importantly possessed by the compositions according to the present invention is their processability. As is well known, the processability of a resin composition often expressed as its melt flow rate (MFR) is an important property and dictates whether the resin can be molded in a molten state into the intricate designs required for many resin applications today. In general, the compositions according to the present invention possess good combinations of melt flow properties with other physical properties such as toughness and gloss.

Within the scope of the present invention, various other types of ingredients can be included in the polymer compositions. Such other ingredients include fillers, pigments, ignition retarding materials and the like. Suitable ignition retarding materials include antimony oxide and halogenated compounds including halogenated polymers such as chlorinated polyethylene.

EXAMPLES

The following examples of compositions according the present invention are prepared by blending together various separately prepared elements. The large and small emulsion particles are incorporated into compositions according to the present invention in the form of grafted rubber concentrates (GRC's). Such GRC's are produced by grafting monovinylidene aromatic polymer onto the previously prepared emulsion particles. Such grafting reaction also produces some ungrafted monovinylidene aromatic polymer. In the following examples, GRC's containing both small and large emulsion particles were prepared by partially agglomerating a latex of small emulsion particles to produce a latex containing a group of large emulsion particles along with an amount of unagglomerated small emulsion particles. The grafting was then done while both particle groups remained in the latex.

Preparation of GRC-A

To an aqueous latex containing 38 percent by weight in the form of 0.1 micron particles of emulsion-produced butadiene-styrene-acrylonitrile (92-5-3) rubber is added 1.5 percent weight, based on the weight of the rubber, of a 10% aqueous solution of sodium N-dodecylbenzene sulfonate. The latex is heated to 70° C. and the small particles are partially agglomerated to form a mixture of small and large particles by the addition of about 0.76 percent weight, based on the weight of the rubber, of an agglomerating agent consisting of a polybutadiene core with a shell of ethylacrylatemethacrylic acid copolymer (92/8). The agglomerating agent is in the form of a latex which also contains three percent sodium N-dodecylbenzene sulfonate soap. Under these conditions, 40 percent by weight of the rubber particles in the latex are converted thereby to large particles having an average particle size of 0.7 microns. This mixture of particles is then grafted with polystyrene by continuously adding over a 4.4 hour period, a monomer stream and an aqueous stream to the latex while the latex is being maintained at 70° C. The monomer stream consists of styrene and n-octylmercaptan and supplies 0.32 weight percent N-octylmercaptan and 91.9 weight percent styrene, said weight percents being based on the weight of the rubber in the latex. The aqueous stream consists of water, sodium persulfate initiator and sodium dodecylbenzene sulfonate and supplies 0.21 weight percent sodium persulfate initiator and 2.3 weight percent sodium dodecylbenzene sulfonate, said weight percents being based on the weight of the rubber. The resultant latex is phen heated for one hour after the additions had finished, stabilized with antioxidants and the resultant polymer and grafted rubber isolated by freeze coagulation. This product, referred to as GRC-A contains 57.2 percent rubber, the balance being grafted and ungrafted polystyrene. The weight average molecular weight of the polystyrene is about 72,700 and ratio of the weight of the grafted polystyrene to the weight of the rubber (g/r) is about 0.18.

Preparation of GRC-B

The preparation of GRC-B is similar to the preparation of GRC-A except that 1.0 percent by weight of the aqueous solution of sodium dodecylbenzene sulfonate is added to the rubber latex in the reactor before the agglomeration, and 1.0 percent by weight polymeric agglomerating agent based on the weight of the rubber to be agglomerated is added. Under these conditions, 63 percent by weight of the small rubber particles are converted to large particles, the group of large particles having a weight average diameter of 0.7 microns. The resultant latex containing both small and large rubber particles is then grafted with the monomer feed mixture as in GRC-A except that 92.1 percent by weight of styrene and 0.19 percent by weight of N-octylmercaptan are used, said weight percents being based on the weight of the rubber to be grafted. The decrease in mercaptan produces grafted polymer having higher molecular weight than that in GRC-A. The final rubber content of the GRC is 54.7 percent. The weight average molecular weight of the polystyrene is about 110,000.

Preparation of GRC-C

GRC-C, a monodisperse GRC, is prepared in the same manner as GRC-A and GRC-B, but omitting the agglomeration step. The same aqueous latex of rubber is grafted under the same general conditions, the monomer stream was continuously added over a 7 hour period and supplies 100 weight percent styrene and 0.15 weight percent n-octylmercaptan, based on the weight of rubber in the latex. In this case, the aqueous stream supplies 0.25 weight percent sodium persulfate initiator based on the weight of the rubber which is to be grafted, 0.05 weight percent being supplied as an initial charge before the monomer stream is started, the remaining 0.20 weight percent being supplied in a continuous stream throughout the 7 hour addition period. The final product contains 52 percent by weight rubber, the balance being grafted and ungrafted polystyrene. The weight average molecular weight of the polystyrene is about 78,600 and the ratio of the weight of the grafted polystyrene to the weight of the rubber is about 0.56.

Preparation of GRC-D

GRC-D is prepared in the same manner as GRC-C and has the same composition except that the latex is partially agglomerated prior to grafting to produce a bi-modal particle size distribution as with GRC's A and B. About 50 percent by weight of the latex rubber is agglomerated to large particles (1.0μ average particle diameter) by the addition of 1.5 percent by weight of the polymeric agglomerating agent based on the weight of the rubber to which it is added.

Blends of the GRC's with Mass Particle Components and Polystyrene

The GRC's produced above are then blended with a mass particle component containing large mass rubber particles dispersed in a polystyrene homopolymer matrix and/or a polystyrene homopolymer to obtain desired rubber concentrations in the resultant polymeric composition.

The mass particle components used in the examples are commercially available high impact polystyrene (HIPS) resins. The first mass particle component, HIPS A, contains about 7.2 percent by weight polybutadiene rubber in the form of particles having an average particle size (volume average) of about 2.25 microns. The weight average molecular weight of the polystyrene is about 195,000.

Another mass particle component, HIPS B, contains about 9 percent by weight polybutadiene rubber in the form of particles having an average particle size (volume average) of about 1.09 microns. The weight average molecular weight of the polystyrene is about 210,000.

Also used as the mass particle component in some blends was HIPS C. This resin contains about 4.8 percent by weight polybutadiene rubber in the form of particles having an average particle size (volume average) of about 1.84 microns. The weight average molecular weight of the polystyrene is about 225,000.

The homopolymer polystyrene, also referred to general purpose polystyrene (GP PS), used in some of the blends, GP PS 1, has a weight average molecular weight of about 300,000 and a melt flow rate of 1.4 grams per 10 minutes. Another homopolymer polystyrene, GP PS 2, is used in some blends and has a weight average molecular weight of about 230,000.

The physical properties shown in the tables below are measured according to various known techniques. The samples which are prepared for these tests, unless indicated, are injection molded on a Negri Bossi injection molding machine using a 2 ounce shot. The mold temperature is about 110° F. and the barrel temperature profile is from 375° to 400° F. The injection pressure is 800 psi and the hold pressure is 600 psi. A 30 second cycle is used. The tensile strengths at yield and rupture (Ty and Tr, respectively) as well as the percent elongation (%E) are determined according to ASTM (American Society for Testing Materials) D-638 at 0.2 inches per minute and given in pounds per square inch (psi). The notched Izod impact strength (Izod) values are determined according to ASTM D-256 at 73° F. and given in foot pounds per inch of notch (ft.lbs.). Gloss values are determined according to ASTM D-523 at an angle of 60° using a Gardner gloss meter and are given in percent. The melt flow rates are determined according to ASTM D-1238 using Condition "G" and are given in grams per 10 minutes.

In the determination of Gardner dart impact resistance values, a 3.63 kg drop weight with a fixed dart is dropped onto a round sample two inches in diameter and an eighth inch thick resting on a circular 3.2 cm opening. The dart is 1.59 cm long, the point or tip having a radius of curvature of 0.795 cm. The weight is dropped from various heights until the dart breaks through the sample. The force in inch-pounds at which the sample breaks is then determined.

The compositional details and properties of these blends are shown below in Table I.

TABLE I

| Composition No. | Composition Ingredients | | | | Overall Rubber Content (wt %) | Properties | | | | | | |
|---|---|---|---|---|---|---|---|---|---|---|---|---|
| | Bimodal GRC-A (wt %) | Bimodal GRC-B (wt %) | GP PS 1 (wt %) | HIPS A (wt %) | | Ty (psi) | Tr (psi) | % E | Izod (ft/lbs) | Gloss (%) | MFR (g/10 min) | Gardner Dart (in/lbs) |
| 1* | 0 | 36.6 | 63.4 | 0 | 20 | 4310 | 3375 | 8 | 0.58 | 55 | 0.17 | 72 |
| 2 | 0 | 5.9 | 0 | 94.1 | 10 | 3280 | 2865 | 51 | 1.89 | 20 | 2.44 | 36 |
| 3 | 0 | 16.4 | 0 | 83.6 | 15 | 3185 | 2605 | 61 | 2.91 | 19 | 1.11 | 220 |
| 4 | 5.6 | 0 | 0 | 94.4 | 10 | 3275 | 2845 | 54 | 1.95 | 20 | 2.56 | 20 |
| 5 | 15.16 | 0 | 0 | 84.4 | 15 | 3165 | 2580 | 64 | 2.78 | 23 | 1.47 | 207 |
| 6 | 0 | 21.9 | 36.4 | 41.7 | 15 | 3835 | 2790 | 38 | 3.05 | 23 | 0.80 | 187 |
| 7* | 0 | 0 | 0 | 100 | 7.2 | 3325 | 3035 | 41 | 1.66 | 20 | 2.26 | 87 |

*Comparative Example, not an example of the present invention.

As can be seen from Table I above, the compositions according to the present invention possess very desirable combinations of toughness (shown by the high %E, Izod and Gardner Dart values), gloss and processability properties.

Compositions numbered 8 through 12 in Table II below further illustrate the desirable resins which can be obtained according to the present invention.

TABLE II

| Composition No. | Composition Ingredients | | | | | | | |
|---|---|---|---|---|---|---|---|---|
| | Monodisperse GRC-C (% by wt) | Bimodal GRC-D (% by wt) | GP PS (% by wt) | HIPS (% by wt) | Rubber Content (% by wt) | Small Emulsion Particles (% by wt) | Large Emulsion Particles (% by wt) | Large Mass Particles (% by wt) |
| 8* | 23.8 | — | 48.4[3] | 27.8[1] | 15 | 12.4 | — | 2.6 |
| 9* | 14.1 | — | 0.6[4] | 85.3[1] | 15 | 7.3 | — | 7.7 |
| 10 | — | 14.1 | 0.6[4] | 85.3[1] | 15 | 3.6 | 3.6 | 7.7 |
| 11* | 21.6 | — | 1.1[4] | 77.3[2] | 15 | 11.2 | — | 3.8 |
| 12 | — | 21.6 | 1.1[4] | 77.3[2] | 15 | 5.6 | 5.6 | 3.8 |

| | Properties | | | | | | |
|---|---|---|---|---|---|---|---|
| Composition No. | Ty (psi) | Tr (psi) | % E | Izod (ft/lbs) | Gloss (%) | MFR (g/10 min) | Gardner Dart (in/lbs) |
| 8* | 3760 | 2976 | 28 | 0.9 | 92 | 1.8 | 50 |
| 9* | 3560 | 3050 | 44 | 2.6 | 84 | 1.5 | 320 |
| 10 | 3500 | 3015 | 42 | 2.7 | 85 | 1.6 | 320 |
| 11* | 3555 | 3150 | 45 | 3.3 | 47 | 1.4 | 320 |

TABLE II-continued

| | | | | | | | |
|---|---|---|---|---|---|---|---|
| 12 | 3490 | 3160 | 64 | 3.6 | 53 | 1.5 | 320 |

*Not examples of the present invention.
[1] HIPS B
[2] HIPS C
[3] GP PS 2
[4] GP PS 1

Environmental Stress Crack Resistance

The compositions according to the present invention also possess good environmental stress crack resistance properties as shown in Table III, below. Environmental stress crack resistance is determined by putting a test sample under tensile load and at the same time contacting the stressed portion with a cottonseed oil/oleic acid composition. The test sample in the present evaluation is a compression-molded, bar about 4 inches long, 0.5 inches wide and 0.125 inches thick. At a point about halfway down the length of the bar, notches are cut in both edges of the bar, through the thickness of the bar, perpendicular to both the width and length directions. The arc-shaped notches are approximately 0.06 inch deep and have a 0.25 inch radius of curvature. The width of the bar remaining between the two notches is measured, and along with the thickness, is used to calculate what tensile load on the ends of the bar is required to achieve the desired tensile stresses at the point of the notch. Then, while the bar is under the tensile stress, the cottonseed oil/oleic acid mixture is liberally applied to the surface of the bar in and around the notches. This test is described in an article by R. A. Bubeck, C. B. Arends, E. L. Hall and J. B. Vander Sande, entitled "Environmental Stress Cracking in Impact Polystyrene", in *Polymer Engineering Science*, Volume 10, pages 624–633, published in 1981.

It has been found that the compositions containing trimodal rubber particle distributions (i.e., large mass particles, large emulsion particles and small emulsion particles) have better resistance to environmental stress cracking than equivalent compositions according to the prior art containing only large mass particles and small emulsion particles.

Tables III and IV below show the amount of time in minutes required for the bars to fail when the specified tensile stresses are applied, the stresses being given in pounds per square inch. The compositions are those prepared and described above in Tables I and II.

TABLE III
ENVIRONMENTAL STRESS CRACK RESISTANCE

| | Time (minutes) to Failure at Various Specified Stresses Tensile Stresses (pounds per square inch) | | | | | |
|---|---|---|---|---|---|---|
| Composition No. | 2000 psi | 1500 psi | 1200 psi | 1000 psi | 800 psi | 500 psi |
| 3 | 18 | 201 | 878 | 1266 | 2333 | 50,000+ |
| 5 | 6 | 62 | 259 | ** | 363 | 490 |
| 6 | 55 | 146 | 266 | 287 | 414 | 3,795 |
| 7* | 14 | ** | 70 | 81 | 115 | 156 |

*Comparative Example - Not an example of the present invention.
**Value was not measured.

TABLE IV

| Composition No. | Particle Distribution Type | Rubber Particles type-size-% by wt based on rubber | Time to Failure at 500 psi |
|---|---|---|---|
| 9* | Bimodal | Mass - 1.0μ - 49% <br> Small emulsion - 0.1μ - 51% | 258 minutes |
| 10 | Trimodal | Mass - 1.0μ - 49% | 500 minutes |
| 11* | Bimodal | Small emulsion - 0.1μ - 25% <br> Large emulsion - 1.0μ - 26% <br> Mass - 1.8μ - 25% <br> Small emulsion - 0.1μ - 75% | 357 minutes |
| 12 | Trimodal | Mass - 1.8μ - 25% <br> Small emulsion - 0.1μ - 37.5% <br> Large emulsion - 1.0μ - 37.5% | 456 minutes |

*Comparative example - not an example of the present invention.

As can be seen in Tables III and IV, above, compositions according to the present invention, in general, have good environmental stress crack resistance.

As is apparent from the foregoing specification, the present invention is susceptible of being embodied with various changes and modifications to achieve various desired characteristics in the final compositions. For this reason, it is to be understood that all of the foregoing is intended to be merely illustrative and not restricting or otherwise limiting the scope of the present invention except as it is set forth and defined in the following claims.

What is claimed is:

1. An improved rubber-modified monovinylidene aromatic polymer composition comprising:
   (a) a matrix consisting of a homopolymer of a monovinylidene aromatic monomer, and
   (b) an elastomeric material (rubber), in an amount sufficient to toughen said composition, such elastomeric material being in the form of discrete particles dispersed throughout the matrix of the monovinylidene aromatic polymer and grafted with monovinyliden aromatic polymer;

wherein the improvement comprises the dispersed rubber particles comprising the following three components:
   (1) a small particle component being from about 5 to about 85 weight percent of the rubber, the particles of this component having a volume average diameter of from about 0.04 to about 0.30 microns (μ);
   (2) a large eumulsion particle component being from about 5 to about 85 weight percent of the rubber, the particles of this component having a volume average diameter of from about 0.4 to about 3.0μ; and
   (3) a large mass particle component being from about 2 to about 90 weight percent of the rubber, comprising a rubber substrate having monovinylidene aromatic polymer grafted thereon and occuleded therein the rubber substrate comprising up to 9 percent by weight of a rubber-modified monovinylidene aromatic polymer prepared by a mass, mass-solution or mass-suspension polymerization process, which rubber-modified monovinylidene aromatic polymer is contained in the improved rubber-modified monovinylidene aromatic polymer composition the particles of this component having a volume average diameter of from aobut 0.6 to about 10.0μ.

2. A composition according to claim 1 wherein the particles of the small particle component have a volume average diameter of from about 0.09 to about 0.2 microns.

3. A composition according to claim 1 wherein the particles of the large emulsion particle component are agglomerates of smaller emulsion particles.

4. A composition according to claim 1 wherein the particles of the large emulsion particle component have a volume average diameter of from about 0.6 to about 2.5 microns.

5. A composition according to claim 1 wherein the particles of the large mass particle component have a volume average diameter of from about 0.7 to about 5 microns.

6. A composition according to claim 1 wherein the particles of the large mass particle component have a volume average diameter of from about 0.8 to about 1.5 microns.

7. A composition according to claim 1 wherein the rubber is present in an amount of from about 2 to about 25 percent by weight based on total composition weight.

8. A composition according to claim 1 wherein the rubber is present in an amount of from about 3 to about 22 percent by weight based on total composition weight.

9. A composition according to claim 1 wherein the rubber is present in an amount of from about 5 to about 18 percent by weight based on total composition weight.

10. A composition according to claim 1 wherein component (1) is from about 8 to about 45 percent by weight of the rubber.

11. A composition according to claim 1 wherein component (1) is from about 10 to about 40 percent by weight of the rubber.

12. A composition according to claim 1 wherein component (2) is from about 10 to about 80 percent by weight of the rubber.

13. A composition according to claim 1 wherein component (2) is from about 15 to about 50 percent by weight of the rubber.

14. A composition according to claim 1 wherein component (3) is from about 15 to about 85 percent by weight of the rubber.

15. A composition according to claim 1 wherein component (3) is from about 15 to about 50 percent by weight of the rubber.

16. A composition according to claim 1 wherein the volume average particle diameter of component (1) is from about 0.09 to about 0.2μ, of component (2) is from about 0.6 to about 2.5μ and of component (3) is from about 0.8 to about 1.5μ.

17. A composition according to claim 1 wherein the ratio of the weight of grafted polymer to the weight of rubber (g/r) for the rubber in components (1) and (2) is at least about 0.1.

18. A composition according to claim 1 wherein the ratio of the weight of grafted polymer to the weight of rubber (g/r) for the rubber in components (1) and (2) is a least about 0.15 to about 1.

19. A composition according to claim 1 wherein the environmental stress crack resistance is improved as compared to a similar composition containing the same amount of rubber in the form of a small particle component and a large mass particle component.

20. A composition according to claim 3 wherein the environmental stress crack resistance is improved as compared to a similar composition containing the same amount of rubber in the form of a small particle component and a large mass particle component.

21. A composition according to claim 1 wherein component (1) is from about 5 to 15 percent by weight of the rubber and has a volume average particle size of from about 0.09 to about 0.2 microns; component (2) is from about 10 to about 50 percent by weight of the rubber and has a volume average particle size of from about 0.6 to about 2.5 microns; and component (3) is from about 50 to about 80 percent by weight of the rubber and has a volume average particle size of from about 1.5 to about 5 microns.

22. A composition according to claim 1 wherein component (1) is from about 15 to 85 percent by weight of the rubber and a volume average particle size of from about 0.09 to about 0.2 microns; component (2) is from about 15 to about 80 percent by weight of the rubber and has a volume average particle size of from about 0.6 to about 2.5 microns; and component (3) is from about 2 to about 50 percent by weight of the rubber and has a volume average particle size of from about 0.8 to about 1.5 microns.

23. An improved composition according to claim 1 wherein in component (3) the rubber substrate comprises from about 4.8 to 9.0 percent by weight of the rubber-modified monovinylidene aromatic polymer prepared by a mass, mass-solution or mass suspension polymerization process.

* * * * *

UNITED STATES PATENT AND TRADEMARK OFFICE
CERTIFICATE OF CORRECTION

PATENT NO. : 4,785,051

DATED : Nov. 15, 1988

INVENTOR(S) : David E. Henton

Page 1 of 2

It is certified that error appears in the above-identified patent and that said Letters Patent is hereby corrected as shown below:

Title page, Related U.S. Application Data Section,
"Ser. No. 353,910" should read --Ser. No. 553,910--.

Col. 1, line 63, "reference to a" should read --referred to as--.

Col. 3, line 57, "sbbstantial" should read --substantial--.

Col. 9, line 60, "phen" should read --then--.

Table I, Bimodal GRD-A (wt%) column, "15.16" should read --15.6--.

UNITED STATES PATENT AND TRADEMARK OFFICE
CERTIFICATE OF CORRECTION

PATENT NO. : 4,785,051

DATED : Nov. 15, 1988

INVENTOR(S) : David E. Henton

It is certified that error appears in the above-identified patent and that said Letters Patent is hereby corrected as shown below:

Col. 14, line 47, "monovinyliden" should read --monovinylidene--.

Col. 14, line 55, "eumulsion" should read --emulsion--.

Col. 14, line 63, "occuleded" should read --occluded--.

Col. 15, line 4, "aobut" should read --about--.

Col. 16, line 16, "a least" should read --at least--.

Signed and Sealed this

Tenth Day of October, 1989

Attest:

DONALD J. QUIGG

Attesting Officer

Commissioner of Patents and Trademarks